United States Patent
Qiu et al.

(10) Patent No.: US 11,003,516 B2
(45) Date of Patent: May 11, 2021

(54) GEOGRAPHICAL REDUNDANCY AND DYNAMIC SCALING FOR VIRTUAL NETWORK FUNCTIONS

(71) Applicant: AT&T Intellectual Property I, L.P., Atlanta, GA (US)

(72) Inventors: Chaoxin Qiu, Austin, TX (US); Robert F. Dailey, Austin, TX (US); Mark A. Ratcliffe, Oakhurst, NJ (US); Jeffrey L. Scruggs, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 140 days.

(21) Appl. No.: 15/657,518

(22) Filed: Jul. 24, 2017

(65) Prior Publication Data
US 2019/0026168 A1    Jan. 24, 2019

(51) Int. Cl.
*G06F 9/54* (2006.01)
*G06F 9/455* (2018.01)
*H04L 12/00* (2006.01)

(52) U.S. Cl.
CPC .......... *G06F 9/546* (2013.01); *G06F 9/45504* (2013.01); *G06F 9/45558* (2013.01); *H04L 12/00* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,356,297 B1 * | 1/2013 | Posva | G06F 9/45504 718/1 |
| 8,391,494 B1 * | 3/2013 | Serenyi | H04L 63/0428 380/278 |
| 8,953,439 B1 * | 2/2015 | Lin | G06F 11/1484 370/219 |
| 9,473,567 B2 | 10/2016 | Parikh et al. | |
| 9,584,377 B2 * | 2/2017 | Prasad | |
| 9,979,602 B1 * | 5/2018 | Chinnakannan | H04L 47/82 |

(Continued)

FOREIGN PATENT DOCUMENTS

| | | | |
|---|---|---|---|
| CN | 106656553 A * | 5/2017 | |
| WO | WO-2016070302 A1 * | 5/2016 | ......... H04L 67/1095 |

(Continued)

OTHER PUBLICATIONS

A. Sheoran, X. Bu, L. Cao, P. Sharma and S. Fahmy, "An empirical case for container-driven fine-grained VNF resource flexing," 2016 IEEE Conference on Network Function Virtualization and Software Defined Networks (NFV-SDN), 2016, pp. 121-127, doi: 10.1109/NFV-SDN.2016.7919486. (Year: 2016).*

*Primary Examiner* — Abu Zar Ghaffari
(74) *Attorney, Agent, or Firm* — BakerHostetler (57) ABSTRACT

When a virtualized service platform encounters a catastrophic fault, an orchestrator may instantiate new virtual machines instances to deploy additional capacity in other cloud locations to handle failover storms. After the network fault is fixed and service returns to normal condition, these additional VM instances may be removed from the platform and cloud resources may be released. The system may minimize the resource over-provisioning and may continue to support geographical redundancy or dynamic scaling in a large-scale service network.

15 Claims, 6 Drawing Sheets

(56) References Cited

U.S. PATENT DOCUMENTS

| | | | |
|---|---|---|---|
| 10,044,581 B1* | 8/2018 | Russell | H04L 43/08 |
| 10,140,112 B2* | 11/2018 | Takano | G06F 8/65 |
| 10,455,412 B2* | 10/2019 | Huang | H04L 41/0813 |
| 10,481,953 B2* | 11/2019 | Iwashina | H04L 47/70 |
| 2015/0268643 A1* | 9/2015 | Patil | H02J 3/382 |
| | | | 700/287 |
| 2015/0295750 A1* | 10/2015 | Blanco | G06F 9/50 |
| | | | 714/4.2 |
| 2015/0309813 A1* | 10/2015 | Patel | G06F 8/75 |
| | | | 703/22 |
| 2015/0317169 A1* | 11/2015 | Sinha | H04L 61/2076 |
| | | | 713/2 |
| 2015/0326448 A1* | 11/2015 | Chaudhary | G06Q 20/14 |
| | | | 705/40 |
| 2015/0358248 A1* | 12/2015 | Saha | H04L 45/5096 |
| | | | 709/226 |
| 2015/0365352 A1 | 12/2015 | Xiang | |
| 2016/0043944 A1* | 2/2016 | Felstaine | H04L 45/70 |
| | | | 370/389 |
| 2016/0050161 A1* | 2/2016 | Da | H04L 47/783 |
| | | | 709/226 |
| 2016/0057075 A1 | 2/2016 | Parikh et al. | |
| 2016/0103698 A1 | 4/2016 | Yang et al. | |
| 2016/0149807 A1* | 5/2016 | Zanfei | H04L 12/2856 |
| | | | 709/238 |
| 2016/0170848 A1 | 6/2016 | Yang et al. | |
| 2016/0179582 A1* | 6/2016 | Skerry | G06F 9/5027 |
| | | | 718/1 |
| 2016/0234082 A1 | 8/2016 | Xia et al. | |
| 2016/0299772 A1 | 10/2016 | Seenappa et al. | |
| 2016/0308715 A1* | 10/2016 | Rasanen | H04L 41/0806 |
| 2016/0350151 A1* | 12/2016 | Zou | G06F 9/45558 |
| 2016/0366014 A1 | 12/2016 | Koo | |
| 2017/0005515 A1* | 1/2017 | Sanders | H02J 3/381 |
| 2017/0034050 A1* | 2/2017 | Sunavala | H04L 49/70 |
| 2017/0093749 A1* | 3/2017 | Hoffmann | G06F 9/5077 |
| 2017/0104609 A1* | 4/2017 | McNamee | H04L 12/4641 |
| 2017/0150399 A1* | 5/2017 | Kedalagudde | H04L 43/16 |
| 2017/0171015 A1* | 6/2017 | Lin | H04L 47/78 |
| 2017/0214608 A1* | 7/2017 | Jilani | H04L 47/35 |
| 2017/0237647 A1* | 8/2017 | N. | H04L 43/16 |
| | | | 709/224 |
| 2017/0257276 A1* | 9/2017 | Chou | H04L 41/0896 |
| 2017/0272380 A1* | 9/2017 | Rao | H04L 47/823 |
| 2017/0373938 A1* | 12/2017 | Raether | H04L 41/0816 |
| 2018/0123870 A1* | 5/2018 | Xue | H04L 41/00 |
| 2018/0241630 A1* | 8/2018 | Andrianov | H04L 41/0896 |
| 2018/0246746 A1* | 8/2018 | Miller | G06F 9/5077 |
| 2018/0287864 A1* | 10/2018 | Hockett | H04L 41/082 |
| 2018/0307292 A1* | 10/2018 | Mayer | G06F 9/45558 |
| 2019/0028350 A1* | 1/2019 | Yeung | H04L 9/0894 |
| 2019/0199613 A1* | 6/2019 | Jambur Sathyanarayana | |
| | | | H04L 43/0876 |
| 2019/0394658 A1* | 12/2019 | Baillargeon | H04W 40/248 |

FOREIGN PATENT DOCUMENTS

| | | | |
|---|---|---|---|
| WO | WO-2016095121 A1 * | 6/2016 | |
| WO | WO-2016115896 A1 * | 7/2016 | H04L 41/00 |
| WO | WO 2016/121728 A1 | 8/2016 | |
| WO | WO 2016/121834 A1 | 8/2016 | |
| WO | WO 2016/145653 A1 | 9/2016 | |
| WO | WO 2016/184037 A1 | 11/2016 | |
| WO | WO-2016197346 A1 * | 12/2016 | H04L 41/00 |
| WO | WO-2017054197 A1 * | 4/2017 | H04L 41/0823 |
| WO | WO-2017076078 A1 * | 5/2017 | H04L 12/46 |

* cited by examiner

GEOGRAPHICAL REDUNDANCY AND DYNAMIC SCALING FOR VIRTUAL NETWORK FUNCTIONS

BACKGROUND

Communication networks have worked from using specialized networking equipment executing on dedicated hardware, like routers, firewalls, and gateways, to software based virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual central processing units (vCPUs), and network interfaces or network interface cards (NICs).

Conventional non-virtualized application services over-provision capacity to provide geographical redundancy in a large-scale network, particularly if the service requires high reliability. For example, a platform that provides Voice-over-LTE and Consumer Voice-over-IP (CVoIP) services, may have network components engineered with more than 8 times of sunny day capacity in order to provide service auto-healing. When a core site is isolated due to a transport network fault, millions of impacted subscribers may re-register to another protection core site, which may result in a traffic spike of 12× to 16× within 15 to 30 minutes in the protection core site. When a catastrophic fault occurs in a part of a service network, other parts of the service network take on the load. When these "failover storms" occur, the over-provisioned capacity is useful. However, over-provisioning results in low resource utilization and higher service cost.

SUMMARY

Disclosed herein is an auto-scaling approach to achieve better cloud resource utilization, while continuing to provide geographical redundancy or dynamic scaling for virtual network functions (VNFs). An exemplary configuration includes a virtual network function node as a collection of two types of VMs. VMs may have external interfaces (e.g., E-VMs) and VMs may be specialized in application logic processing, but without external interfaces (e.g., internal VMs). A control system may automatically scale the quantity of I-VMs based on traffic demands, among other things.

Methods, systems, and apparatuses, among other things, as described herein may provide for geographic redundancy or dynamic scaling for virtual network functions. In an example, a method, system, computer readable storage medium, or apparatus may: obtain information associated with a virtual network function; detect a trigger event based on the information associated with the virtual network function; based on the detected trigger, send a message to obtain additional information associated with the virtual network function; and based on the additional information, determine an amount (e.g., threshold amount) to increase an available capacity for operation of the virtual network function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Presence of conventional systems and need to interwork with such systems prevent virtual network functions from becoming ready for end-to-end service immediately after instantiation, due to a need to change configurations in non-virtualized network components for inter-connections. Further studies reveal that even in a large-scale green-field virtualized service network, the complexity of network topology and application level message routing requirements post a major challenge to use auto-scaling techniques to address the needs of geographical redundancy or dynamic scaling support.

Disclosed herein is a system that can minimize the resource over-provisioning and can continue to support geographical redundancy or dynamic scaling in a large-scale service network. When a virtualized service platform encounters a catastrophic fault, an orchestrator may instantiate new virtual machines (VMs) instances to deploy additional capacity in other cloud locations to handle failover storms. After the network fault is fixed and service returns to normal condition, these additional VM instances may be removed from the platform and cloud resources may be released.

Figure 1:
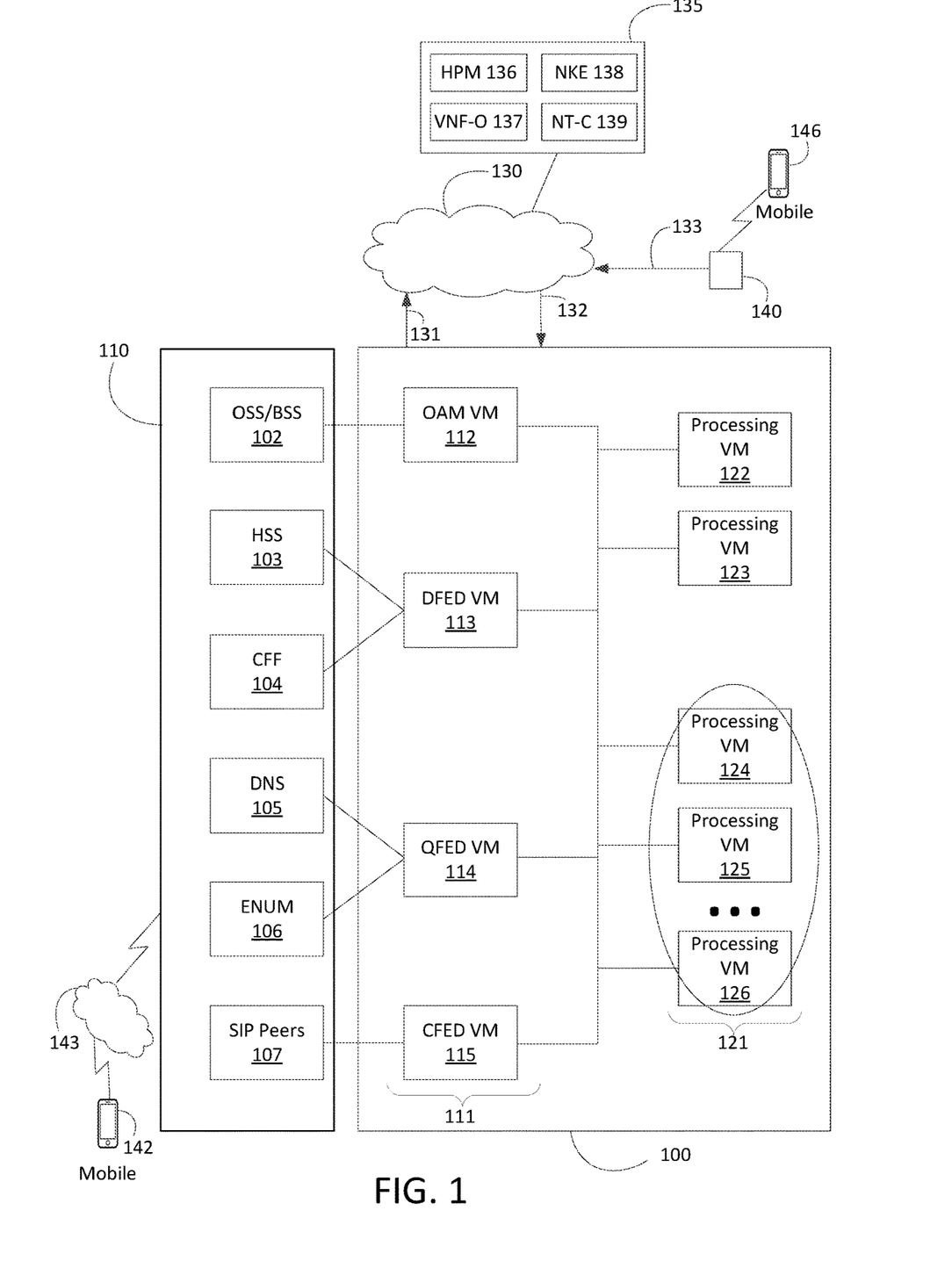
FIG. 1 illustrates an exemplary system that supports redundancy or dynamic scaling for virtual network functions (VNFs).

FIG. 1 illustrates an exemplary service network system that supports redundancy or scaling for application services. Generally, there may be a mobile device 142 that is communicatively connected with one or more network elements 110. As disclosed in more detail herein, VNF Control System (VSC) 135 may communicate with VNF node 100 or VNF node 140. VNF node 140 is also communicatively connected with mobile device 146.

Network elements 110 may be an Operations Support System (OSS) 102, Home Subscriber Server (HSS) 103, Charging Collection Function (CCF) 104, Domain Name System (DNS) 105, Electronic Number Mapping (ENUM) 106, or Session Initiation Protocol (SIP) Peer 107, among others. Network elements 110 may be application entities in a service network such as, firewalls, network storages, telephony application servers, etc. Network elements 110 may be conventional physical server (e.g., chassis based) or may be virtual function based. A virtual function node is a virtualized network element that may be deployed in a cloud. As such, some network elements 110 may be managed by VSC 135 if they are virtualized.

VNF node 100 includes externally-interfacing VMs (E-VMs) 111, such as Operations, Administration, and Maintenance (OAM) VM 112, Diameter Interface Frontend (DFED) VM 113, DNS Query Frontend (QFED) VM 114, or SIP Control Frontend (CFED) VM 115. VNF node 100 may also include internally-facing VMs (I-VMs) 121, such as processing VM 122 through processing VM 126. In an example, as shown in FIG. 1, DNS server 105 is a peer communicatively connected with DNS Query Frontend (QFED) VM 114. QFED VM 114 represents a solidified interface for VNF node 100 to DNS server 105 that is located somewhere in the network. E-VMs 111 minimizes the application processing complexity to achieve high performance and high throughput. As such, there is usually a small number of E-VMs 111 per VNF node 100. I-VMs 121 are specialized in application processing, but without external interfaces.

E-VMs 111 handle external interfaces and connectivity with other network peers. Public internet protocol (IP) addresses may be assigned on the external facing interfaces of E-VMs 111. Public IP addresses (and ports) may be generally available and visible to the public. In this configuration, the public IP address and port will allow external systems (e.g., DNS, HSS, or other SIP peers) to communicate with the VNF node 100. External peers (e.g., DNS 105) may communicate (send and receive packets) with the IP addresses and ports designated for these E-VMs 111. E-VMs 111 may pass messages to internal VMs (I-VMs) 121 via internal or private connections, which are not visible to the outside world.

For VNF node 100 with a fixed number of E-VM 100 instances, the number of I-VMs 121 may vary widely, reacting to the capacity needs, for example, of VNF node 100 in production. I-VMs 121 may be considered processing (or worker) VMs that are added according to the situation. Generally, the disclosed design allows growth (e.g., creating VMs) or degrowth (e.g., removing VMs) of VNF node 100 without changing the external "border" formed by E-VMs 111. Addition or removal of I-VMs 121 are transparent to external peers (e.g., network elements 110) because they only communicate with E-VMs 111. It is E-VMs 111 that have knowledge of which I-VMs 121 are available.

With continued reference to FIG. 1, VSC 135 may include health and performance monitor (HPM) 136, VNF orchestrator (VNF-O) 137, network knowledge engine (NKE) 138, or network traffic controller (NT-C) 139. It is contemplated herein that the components of VSC 135 are logical and may be in one device or distributed among multiple devices. HPM 136 may interface with traditional network management systems (NMS) in non-virtualized networks to monitor the health and to detect faults in the non-virtualized part of the same service platform. HPM 136 may detect network problem and identify trouble spots by analyzing information obtained throughout a network. NKE 138 may maintain information on network topology, such as all data centers that host access components (e.g., Session Border Controllers (SBCs)) or all data centers that host core service components (e.g., Call Session Control Functions (CSCF), Telephony Application Servers (TAS), HSS, etc.). NKE 138 also has information about the capacity needs in each data center in both sunny day (generally normal operations) and rainy day (e.g., significant negative performance issues) scenarios. NKE 138 includes intelligence for the solution and will determine how many additional I-VMs will need to be instantiated for each particular VNF node in some data center (local or remote) when a network fault (e.g., negative performance issue) occurs.

VNF orchestrator (VNF-O) 137 (e.g., Openstack Controller) may receive instructions from NKE 138 to instantiate new I-VM instances for selected VNF nodes (e.g., VNF node 134) at selected data center when needed. NKE 138 may also instruct VNF-O 137 to remove some I-VM instances when the network recovers from fault and returns to normal.

When a site level fault is detected, NKE 138 may anticipate that a "failover storm" will hit other designated protection sites. It is usually preferred to throttle the initial traffic spike (e.g., reduce the usual threshold amount of messages that may be accepted for processing at any given time), while NKE 138 is instructing VNF-O 137 to instantiate more I-VMs to increase capacity of VNF node 100. As such, NT-C 139 may need to set the traffic control at a lower level during sunny day operation and automatically increase the permitted traffic volume after more I-VM instances are instantiated. Although VNF-O 137 may instantiate new I-VMs in a short time window, protecting the network from being overloaded by the failover storm while new I-VMs are spun up is significant for a successful site level failover. In an example, there may be instances where the throttling of traffic processed by (or sent to) network elements 110, E-VMs 111, or I-VMs 121 may be reduced from a normal level to a threshold lower than normal level (or a threshold higher than normal, but lower than an amount that would cause significant performance deterioration (e.g., unusable for its purpose because of packet loss or errors)) to connections that are able to connect with network elements 110, E-VMs 111, or I-VMs 121. In an end-to-end service network, traffic throttling may be implemented at the provider network border, such as various gateways (e.g., session border controllers). Network management systems, such as VSC 135, may be in control of setting and adjusting traffic throttle thresholds.

During this throttling process, messages, service requests or connection requests to network elements 110, E-VMs 111, or I-VMs 121 may be turned away (e.g., dropping messages, reject requests, not given permission to connect, etc.) until sufficient capacity is available when additional I-VMs are instantiated and ready for services.

Figure 2:
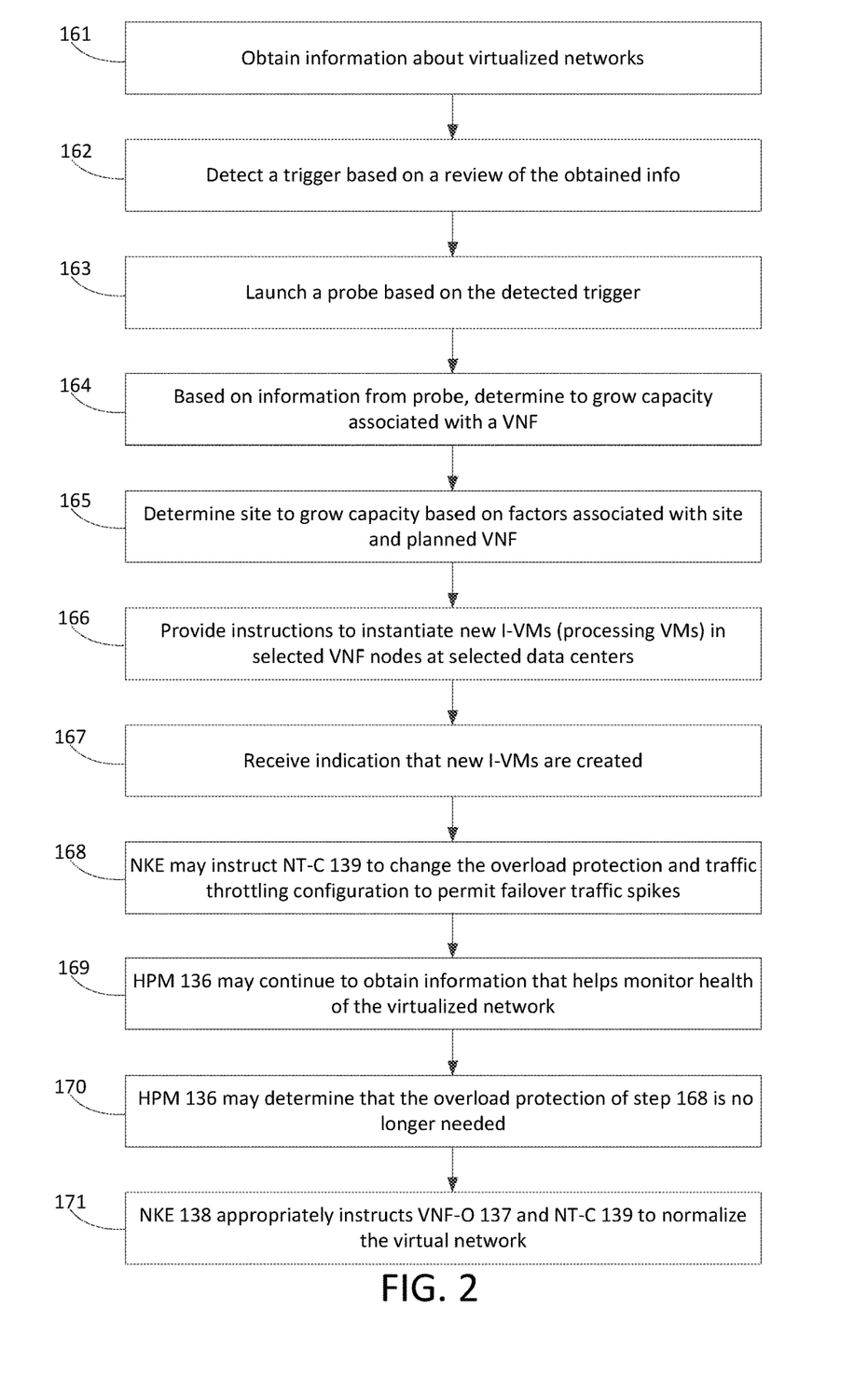
FIG. 2 illustrates an exemplary method for redundancy or dynamic scaling of virtual network functions.

FIG. 2 illustrates an exemplary method that may support cloud resource utilization, which may be executed on VSC 135. It is contemplated that some steps may be omitted. At step 161, HPM 136 may obtain information associated with a virtualized network, such as fault alarms of VNF instances (e.g., process fault, connection unreachable, network element out-of-service; etc.), KPI counters (e.g., number of users, number of active calls, number of service requests, CPU utilization, memory utilization, etc.), system logs (e.g., internal process shutdown, reboot or fail to reboot), or OAM command responses (e.g., health check, operation status, administration status, etc.). It is contemplated that information may be for one geographic site (e.g., one data center in a state) or multiple sites (e.g., up to an entire service provider's network of data centers that may span multiple states).

At step 162, HPM 136 may detect a trigger event based on a review of the obtained information of step 161. A trigger event may include reaching a threshold amount of one or a combination of parameters for one or more VNFs (e.g., DNS 105), VMs (e.g., processing VM 122 or processing VM 123), connections between VMs, or the like. Parameters may be based on or include network latency, processor speed of a device associated with the VNF, battery or energy constraints or performance of a device associated with the VNF, cost (financial) of a communication session(s), reliability, lag, error, number or type of connections to a VM or VNF, or the like. A triggering event may include an indication of an expected social event (e.g., concert or graduation) that may put a strain on a VNF (e.g., DNS 105), time of day, holiday, weekend or weekday, or the like. Social event may be indicated on electronic calendar or social network platform and obtained by HPM 136. This social events scenario is an example of dynamic scaling. Through a learning process, which may be based on information at the same geographical location or similar information in different geographical locations during a period, HPM 136 may proactively create thresholds that indicate a trigger event.

With continued reference to FIG. 2, at step 163, HPM 136 may launch a probe to get additional information (e.g., send a message to obtain additional information). In one example, HPM 136 may receive only a limited set of information (e.g., 10 parameters) and if one of the parameters reaches a threshold amount, then HPM 136 may request additional parameters (e.g., another 30 parameters) to determine if a second triggering event occurred that would indicate capacity should be grown (e.g., by instantiating additional I-VMs). In another example, HPM 136 may receive periodic information that may be relatively old (e.g., 10 minutes) and if one of the parameters reaches a threshold amount, then HPM 136 may request information more frequently (e.g., every 30 seconds). The information may include the same, different, or additional parameters that were obtained with the periodic information.

At step 164, based on information from the probe (step 163) or the detected triggering event (step 162), HPM 136 determines to grow capacity for the VNF (e.g., DNS 105) and may send an indication of fault detection to NKE 138.

At step 165, in response to obtaining an indication of fault detection in step 164, NKE 138 may determine the site (or sites) to grow capacity for call processing VMs (I-VMs 121 such as processing VM 124, processing VM 125, or processing VM 126). The determination may be based on multiple factors associated with the site that may include parameters and triggering events that are disclosed with reference to step 162 and disclosed throughout. Factors may include latency between sites (e.g., latency between site 100 and site 140 may be lower than other sites) or the type of devices (e.g., some hardware or software may not be capable of running certain VMs), among other things.

With continued reference to step FIG. 2, at step 166, NKE 138 provides instructions to VNF-O 137 to instantiate an I-VM in determined VNF nodes at the determined site (e.g., data center) of step 165. At step 167, in response to instructions of step 166, VNF-O 137 instantiates the appropriate I-VM and may provide a message to NKE 138 that confirms that I-VM is instantiated and ready for use. For example, processing VM 124, processing VM 125, and processing VM 126 may be instantiated.

At step 168, NKE 138 may instruct NT-C 139 to change the overload protection and traffic throttling configuration to permit failover traffic spikes. A certain percentage of data traffic may be sent to the newly instantiated VNFs (e.g., processing VM 124, processing VM 125, or processing VM 126). The percentage may be determined based on parameters associated with the individual VMs (e.g., processing VM 124 may get a percentage more than the other processing VM 125 and processing VM 126 based on processing speed of the underlying hardware or processing VM 124 construct). At step 169, HPM 136 may continue to obtain information that helps monitor health of the virtualized network. At step 170, HPM 136 based on the obtained information of step 169, at some time t1, HPM 136 may determine that the overload protection of step 168 is no longer needed and alert NKE 138. This determination may be based on the parameters or antithesis of triggering events of step 162, for example. At step 171, NKE 138 would appropriately instruct VNF-O 137 and NT-C 139 to normalize the virtual network. Normalize may be considered the "sunny day" configuration of the network and may include removing previously added VMs (e.g., processing VM 124, processing VM 125, or processing VM 126). This normalization allows for extra capacity to be used for other VNFs (e.g., HSS or ENUM) when they are in a "rainy day" situation.

Figure 3:
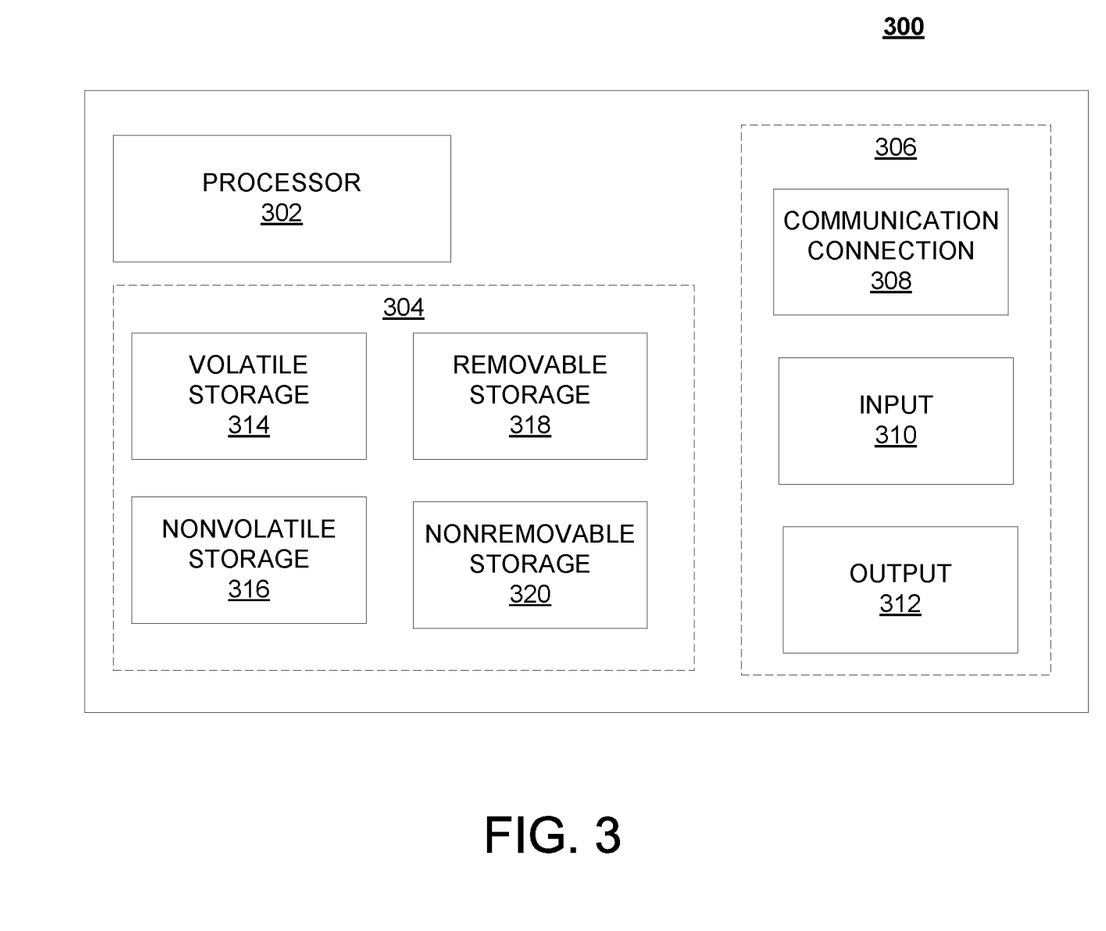
FIG. 3 illustrates a schematic of an exemplary network device.

FIG. 3 is a block diagram of network device 300 that may be connected with or comprise a component of FIG. 1. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
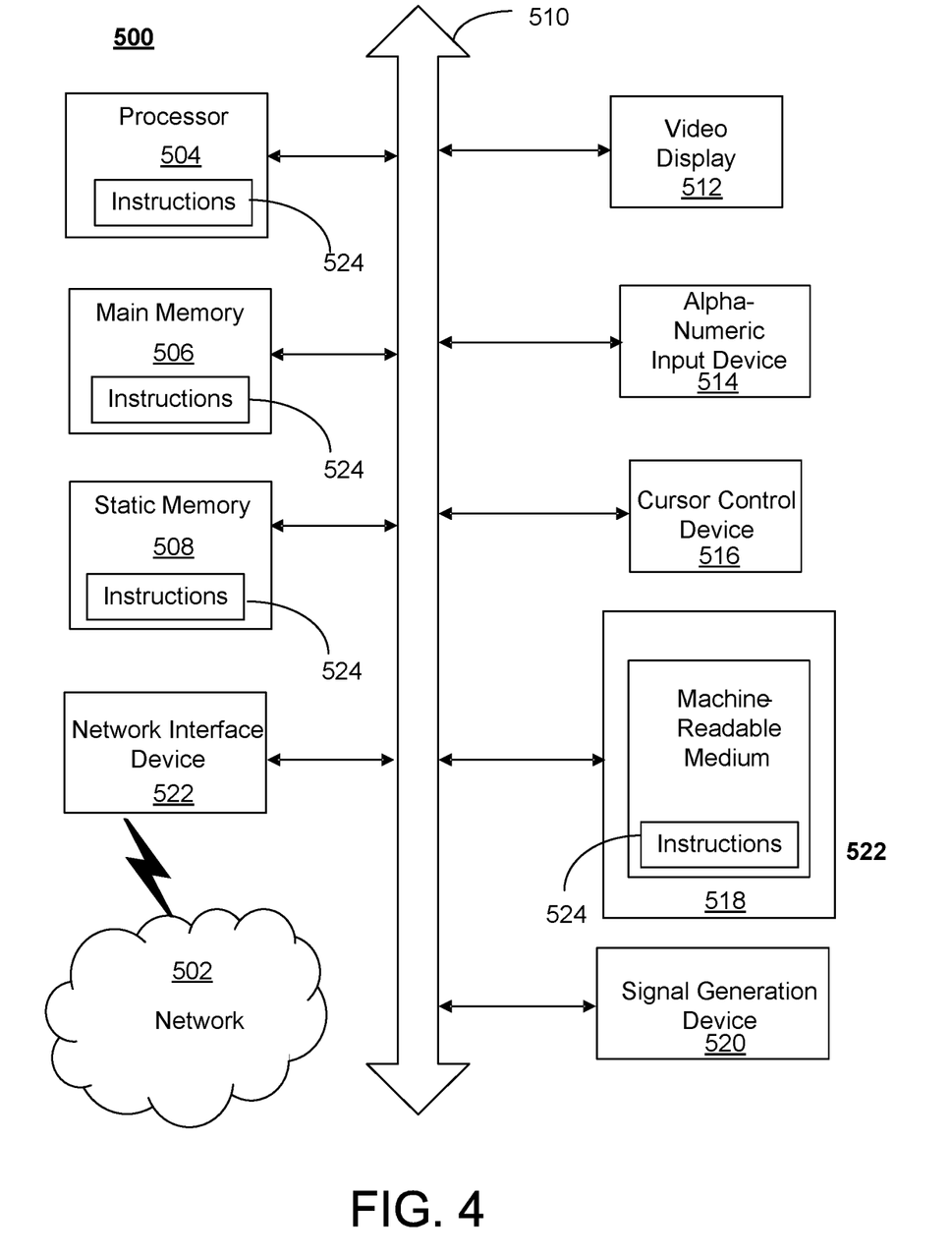
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 142, DNS 105, VSC 135 and other devices of FIG. 1 and FIG. 5B.

In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 5A:
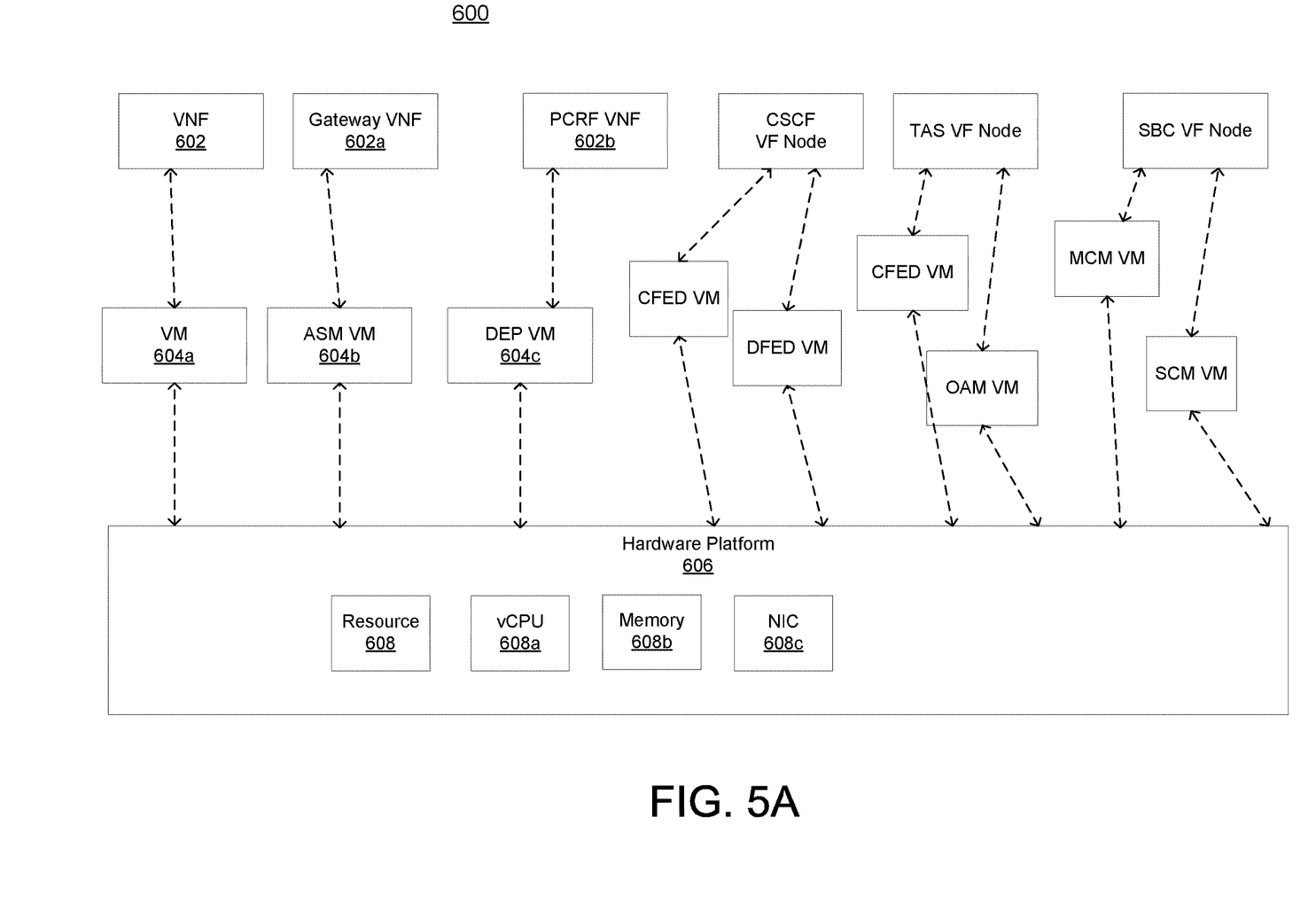
FIG. 5A is a representation of an exemplary network.

FIG. 5A is a representation of an exemplary network 600. Network 600 (e.g., of FIG. 1) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 (e.g., VNFs 101) may be able to support a limited number of sessions. Each VNF 602 may have a VNF type that indicates its functionality or role. For example, FIG. 5A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role.

For example, in FIG. 5A there may be an advanced services module (ASM) VM 604b, a DEP VM 604c, CFED VM, DFED VM, OAM VM, management control module (MCM) VM, SCM VM, or the like. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 5B:
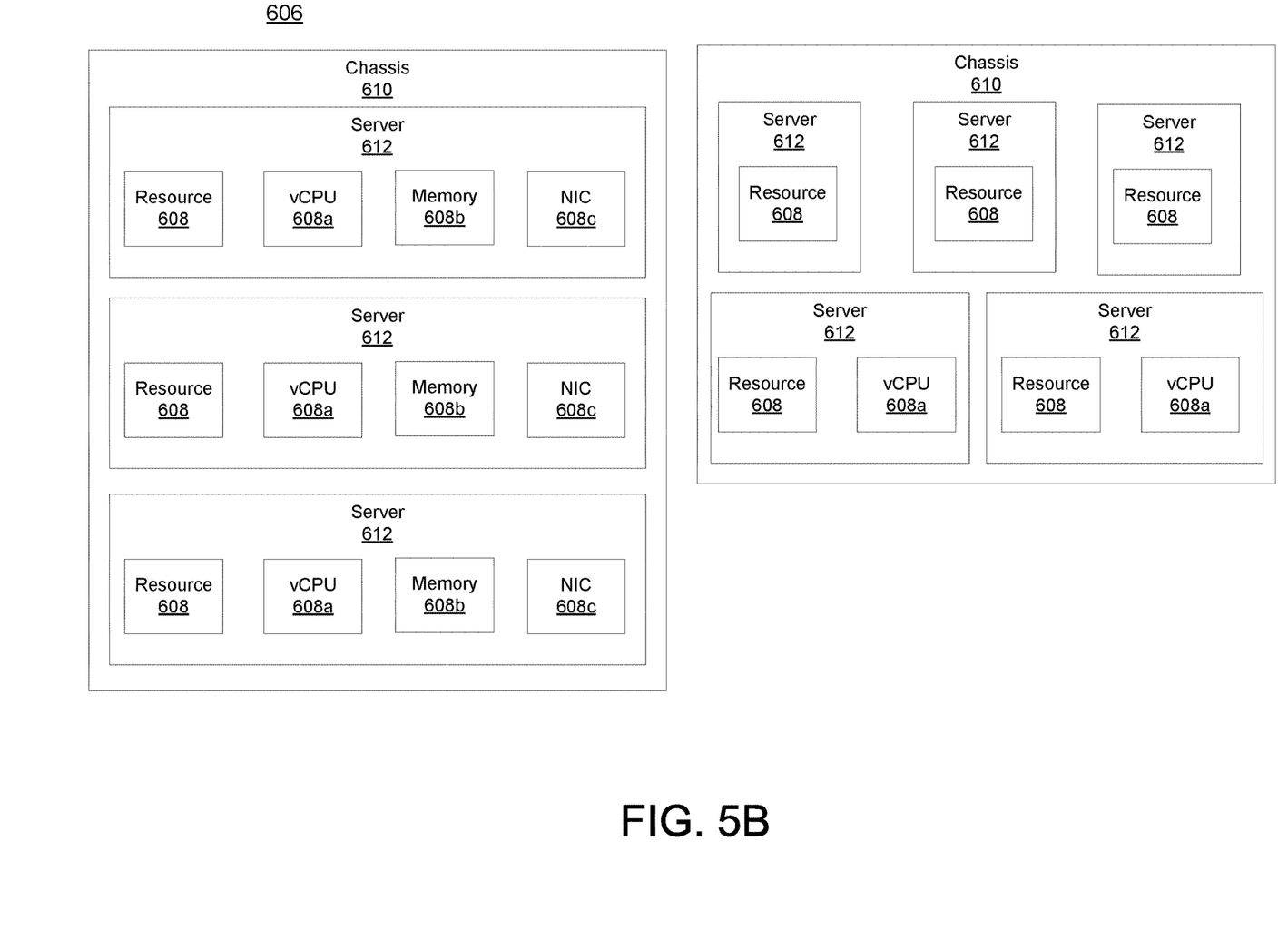
FIG. 5B is a representation of an exemplary hardware platform for a network.

While FIG. 5A illustrates resources 608 as collectively contained in hardware platform 606, the configuration of hardware platform 606 may isolate, for example, certain memory 608c from other memory 608c. FIG. 5B provides an exemplary implementation of hardware platform 606.

Hardware platform 606 may comprise one or more chassis 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chassis 610 may be communicatively coupled. Additionally or alternatively, chassis 610 may be communicatively coupled together (not shown) in any combination or arrangement.

The characteristics of each chassis 610 and each server 612 may differ. For example, FIG. 5B illustrates that the number of servers 612 within two chassis 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six VMs 604a, an affinity rule may dictate that those six VMs 604a be instantiated on the same server 612 (or chassis 610). As another example (not specifically shown in figure), if VNF 602 uses VMs 604a, ASM VMs 604b, and a third type of VMs 604, an affinity rule may dictate that at least the VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chassis 610). For example, an anti-affinity rule may require that VM 604a be instantiated on a particular server 612 that does not contain any ASM VMs 604b. As another example, an anti-affinity rule may require that VMs 604a for a first VNF 602 be instantiated on a different server 612 (or chassis 610) than VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602*b* (which satisfy the PCRF requirement for six million sessions)—would support a total of six million sessions. For the second configuration—two total gateway VNFs 602*a* (which satisfy the gateway requirement for four million sessions) and five total PCRF VNFs 602*b* (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chassis 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which messages for implementing redundancy or scaling for virtual network functions can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—systems for implementing redundancy or scaling for virtual network functions—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for geographic redundancy or dynamic scaling for virtual network functions. A method, system, computer readable storage medium, or apparatus may: obtain information associated with a virtual network function; detect a trigger event based on the information associated with the virtual network function; based on the detected trigger, send a message to obtain additional information associated with the virtual network function; and based on the additional information, determine an amount to increase an available capacity (e.g., increase by a percentage or other numerical value of X, where X may be a number of I-VMs 121, memory amount, processor speed, bandwidth, etc.) for operation of the virtual network function. The method, system, computer readable storage medium, or apparatus may determine a device that includes the amount of capacity; and in response to the determining the device, provide instructions to instantiate a processing virtual machine. The method, system, computer readable storage medium, or apparatus may: based on the additional information, implement a restriction for data traffic processed by the apparatus to a threshold; determine a device that includes the amount of capacity; in response to the determining the device, provide computer executable instructions to instantiate a processing virtual machine; obtain an indication that the processing virtual machine is instantiated; and based on the indication that the processing virtual machine is instantiated, remove the restriction for data traffic processed by the apparatus to the threshold. The additional information may include processor speed of the apparatus. The amount to increase the available capacity for operation of the virtual network function may include an amount of processing virtual machines. The amount to increase the available capacity for operation of the virtual network function may include an amount of processing virtual machines, wherein the amount of processing virtual machines is based on an amount of available memory of a device for the processing virtual machines. The method, system, computer readable storage medium, or apparatus may include determine a device that includes a threshold amount of memory to accommodate the determined amount to increase the available capacity for the virtual network function. All combinations in this paragraph (including the removal or addition of steps) are contemplated in a manner that is consistent with the other portions of the detailed description.

What is claimed:

1. An apparatus comprising:
   a processor; and
   a memory coupled with the processor, the memory storing executable instructions that when executed by the processor cause the processor to effectuate operations comprising:
   obtaining information associated with a virtual network function, wherein the information comprises a key performance indicator (KPI), operations, administration, and maintenance (OAM) information, a system log, memory utilization, number of active calls, or a fault alarm;
   detecting a trigger event, wherein the trigger event is based on a combination of the information associated with the virtual network function and information associated with a first processing virtual machine of a plurality of processing virtual machines with only internal interfaces, wherein the first processing virtual machine is included in the virtual network function node, wherein the plurality of processing virtual machines communicates with one or more external virtual machines, wherein the external virtual machines comprise internal interface and external interfaces, wherein the external interfaces communicate using public internet protocol addresses, wherein the internal interfaces communicate using private internet protocol addresses;
   based on the detected trigger, sending a message to the virtual network function to obtain additional information associated with the virtual network function;
   based on the additional information, determining an amount to increase an available capacity for operation of the virtual network function, wherein the additional information comprises battery performance or energy constraints of a server associated with the virtual network function;
   based on the amount, determining a device that comprises the determined amount to increase the available capacity for the virtual network function;
   in response to the determining the device, providing instructions to instantiate at least a second processing virtual machine of the plurality of processing virtual machines with internal interfaces; and
   sending a percentage of data traffic to the second processing virtual machine, wherein the percentage is based on the information associated with the virtual network function.

2. The apparatus of claim 1, wherein the additional information comprises an indication of an expected social event.

3. The apparatus of claim 1, wherein the additional information comprises processor speed of the apparatus.

4. The apparatus of claim 1, wherein the amount to increase the available capacity for operation of the virtual network function comprises a number of processing virtual machines.

5. The apparatus of claim 1, wherein the amount to increase the available capacity for operation of the virtual network function comprises a number of processing virtual machines, wherein the number of processing virtual machines is based on an amount of available memory of the device for the processing virtual machines.

6. The apparatus of claim 1, the operations further comprising determining the device that comprises a threshold amount of memory to accommodate the determined amount to increase the available capacity for the virtual network function.

7. A method comprising:
   obtaining, by an apparatus, information associated with a virtual network function, wherein the information comprises a key performance indicator (KPI), operations, administration, and maintenance (OAM) information, a system log, memory utilization, number of active calls, or a fault alarm;
   detecting a trigger event, wherein the trigger event is based on a combination of the information associated with the virtual network function and information associated with a first processing virtual machine of a plurality of processing virtual machines with only internal interfaces, wherein the first processing virtual machine is included in the virtual network function node, wherein the plurality of processing virtual machines communicates with one or more external virtual machines, wherein the external virtual machines comprise internal interface and external interfaces, wherein the external interfaces communicate using public internet protocol addresses, wherein the internal interfaces communicate using private internet protocol addresses;

based on the detected trigger, sending a message to the virtual network function to obtain additional information associated with the virtual network function;

based on the additional information, determining an amount to increase an available capacity for operation of the virtual network function, wherein the additional information comprises battery performance or energy constraints of a server associated with the virtual network function;

based on the amount, determining a device that comprises the determined amount to increase the available capacity for the virtual network function;

in response to the determining the device, providing instructions to instantiate at least a second processing virtual machine of the plurality of processing virtual machines with internal interfaces; and sending a percentage of data traffic to the second processing virtual machine, wherein the percentage is based on the information associated with the virtual network function.

8. The method of claim 7, wherein the obtained information comprises an indication of an expected social event.

9. The method of claim 7, wherein the additional information comprises processor speed of the apparatus.

10. The method of claim 7, wherein the amount to increase the available capacity for operation of the virtual network function comprises a number of processing virtual machines.

11. The method of claim 7, wherein the amount to increase the available capacity for operation of the virtual network function comprises a number of processing virtual machines, wherein the amount of processing virtual machines is based on an amount of available memory of the device for the processing virtual machines.

12. The method of claim 7, further comprising determining the device that comprises a threshold amount of memory to accommodate the determined amount to increase the available capacity for the virtual network function.

13. A system comprising:
a remote device; and
an apparatus communicatively connected with the remote device, the apparatus comprising:
a processor; and
a memory coupled with the processor, the memory storing executable instructions that when executed by the processor cause the processor to effectuate operations comprising:
obtaining information associated with a virtual network function, wherein the information comprises a key performance indicator (KPI), operations, administration, and maintenance (OAM) information, a system log, memory utilization, number of active calls, or a fault alarm;

detecting a trigger event, wherein the trigger event is based on a combination of the information associated with the virtual network function and information associated with a first processing virtual machine of a plurality of processing virtual machines with only internal interfaces, wherein the first processing virtual machine is included in the virtual network function node, wherein the plurality of processing virtual machines communicates with one or more external virtual machines, wherein the external virtual machines comprise internal interface and external interfaces, wherein the external interfaces communicate using public internet protocol addresses, wherein the internal interfaces communicate using private internet protocol addresses;

based on the detected trigger, sending a message to obtain additional information associated with the virtual network function;

based on the additional information, determining an amount to increase an available capacity for operation of the virtual network function;

based on the amount, determining that the remote device that comprises the determined amount to increase the available capacity for the virtual network function;

in response to the determining the remote device, providing instructions to instantiate at least a second processing virtual machine of the plurality of processing virtual machines with internal interfaces; and sending a percentage of data traffic to the second processing virtual machine, wherein the percentage is based on the information associated with the virtual network function.

14. The system of claim 13, wherein the amount to increase the available capacity for operation of the virtual network function comprises a number of processing virtual machines.

15. The apparatus of claim 13, the operations further comprising determining that the remote device comprises a threshold amount of memory to accommodate the determined amount to increase the available capacity for the virtual network function.

* * * * *